United States Patent [19]
Angell

[11] Patent Number: 5,590,983
[45] Date of Patent: Jan. 7, 1997

[54] METHOD OF IMPROVING SOIL IRRIGATION WITH AN IMPROVED SOLUTION GRADE CALCIUM SULFATE DIHYDRATE

[76] Inventor: Edwin C. Angell, 7800 Hooper Ave., Bakersfield, Calif. 93308

[21] Appl. No.: 523,462

[22] Filed: Sep. 5, 1995

[51] Int. Cl.$^6$ ............................. E02D 3/00; C01F 11/46; C09K 17/06
[52] U.S. Cl. .................................. 405/263; 47/DIG. 10; 71/903; 405/36; 473/555
[58] Field of Search ................................ 405/36, 52, 263; 71/903; 47/DIG. 10; 423/544, 549, 555

[56] References Cited

U.S. PATENT DOCUMENTS

| | | | |
|---|---|---|---|
| 4,136,998 | 1/1979 | Bassier et al. | 405/263 X |
| 4,191,552 | 3/1980 | Large et al. | 71/86 |
| 4,462,976 | 7/1984 | Karger | 423/555 X |
| 5,376,351 | 12/1994 | Nencini et al. | 423/555 |
| 5,501,719 | 3/1996 | Shida et al. | 405/263 X |

*Primary Examiner*—George A. Suchfield
*Attorney, Agent, or Firm*—Robert J. Schaap

[57] ABSTRACT

A method of improving ground soil irrigation by employing an additive or amendment in the form of an improved synthetic solution grade calcium sulfate dihydrate composition. This composition is formulated by contacting a calcium compound having a calcium cation with a chemical agent enabling the calcium compound to yield calcium ions upon reaction with the chemical agent and which enables the calcium cation to react with an anion of the chemical agent forming a second calcium compound. The second calcium compound is reacted with a sulfur containing acid, such as sulfuric acid, to thereby form a calcium sulfate dihydrate. The compound has improved suspension characteristics and will remain in suspension for a much longer period of time than a conventional solution grade calcium sulfate dihydrate.

19 Claims, 3 Drawing Sheets

METHOD OF IMPROVING SOIL IRRIGATION WITH AN IMPROVED SOLUTION GRADE CALCIUM SULFATE DIHYDRATE

BACKGROUND OF THE INVENTION

1. Field of the Invention

This invention relates in general to certain new and useful improvements in ground soil irrigation and more particularly to an improved ground soil irrigation process which uses the addition of an improved synthetic solution grade calcium sulfate dihydrate as an additive to the soil.

2. Brief Description of the Related Art

Solution grade calcium sulfate dihydrate, typically referred to as Gypsum, ($CaSO_4 \cdot 2H_2O$) is used widely as an additive to agricultural land throughout the United States and many other developed farming regions of the world for improving and maintaining irrigation infiltration rates. It has been found that soils which contain a proper ratio of exchangeable sodium and calcium ions will have a physical structure that is conducive to rapid water penetration. After a period of time, the physical structure of a soil becomes compacted and is not readily penetrable by water during an irrigation process. This is due to the fact that over a period of time the soil is exposed to sources of sodium ions causing the physical structure to deteriorate.

The use of Gypsum and related compounds effectively reverses the process which is caused by the excess exchangeable sodium ions. Thus, the use of a Gypsum as a soil additive will actually restore the ground soil to its natural state in which water penetration is enabled. The restoration process involves a replacement of the excess exchangeable sodium ions by calcium ions and the latter are rendered available by the calcium sulfate dihydrate.

The higher concentration of calcium ion in solution will cause a faster and more complete ion exchange process. However, due to the fact that irrigation is not a continuous process, the extent of the ion exchange process is time dependent. Therefore, in order to optimize the exchange process, it is necessary to provide the highest possible concentration in the shortest period of time. It is therefore desirable to obtain a very high numerical ratio of a Gypsum particle surface area to its volume in order to improve dissolving rates.

One of the problems presently encountered with conventional solution grade calcium sulfate dihydrates in the fact that the calcium sulfate dihydrate does not remain in suspension for a sufficient period of time. Thus, constant agitation is required. Moreover, the solution grade calcium sulfate dihydrate typically will settle in a container of the composition thereby precluding its disbursion as a ground soil additive adding to the difficulties encountered in the use thereof.

There has been a need for an improved ground soil additive in the form of calcium sulfate dihydrate which has a high dissolution rate and will remain in suspension for a long period of time sufficient to enable disbursion as a soil additive.

OBJECTS OF THE INVENTION

It is, therefore, one of the primary objects of the present invention to provide a method of improving ground soil irrigation by adding a synthetic solution grade calcium sulfate dihydrate as a soil additive in a broadcast operation.

It is another object of the present invention to provide a method of improving ground irrigation by adding a calcium sulfate dihydrate soil additive which has highly effective properties for remaining in suspension in water when compared to other conventional solution grade calcium sulfate dihydrate compositions.

It is a further object of the present invention to provide a calcium sulfate dihydrate composition which is effective for restoring soil conditions by exchanging calcium ions for sodium ions existing in the soil.

It is an additional object of the present invention to provide a method of the type stated which relies upon a composition which can be prepared at a relatively low cost and which is highly effective in use.

It is also an object of the present invention to provide a calcium sulfate dihydrate water soluble composition made by an improved method which enables highly effective irrigation filtration rates through the soil when applied to the soil.

It is still another object of the present invention to provide a calcium sulfate dihydrate composition which can be broadcast to a ground soil for correcting a balance of sodium and calcium ions in the ground soil.

It is still a further object of the present invention to provide a method of making a calcium sulfate dihydrate composition highly effective for ground soil application and which can be made at a relatively low cost and which also enables a recycling of other components therefrom.

With the above and other objects in view, my invention resides in the novel features of form, construction and arrangement in combination of steps performed in the method of the present invention as presently set forth and described in the claims.

BRIEF SUMMARY OF THE INVENTION

It is known that an excess of sodium ion in ground soil causes deterioration of the soil. This is due to the fact that the soil compacts upon itself and reduces the pore spaces existing between soil particles and hence reduces the potential for ground irrigation. Soil particles, on the other hand, should contain a proper balance of calcium ions and sodium ions such that the water can percolate through the ground soil. It is also known that an exchange of the calcium ion for a replaceable sodium ion in the soil improves the condition of the soil and allows for improved irrigation. Gypsum is generally provided for this purpose and typically, the gypsum is a commercial grade gypsum and often referred to as a "Soluble Gypsum". The gypsum is broadcast, that is, it is spread from a device to cause the gypsum to be uniformly distributed on the ground surface. As a result, gypsum which is used as a ground soil additive is frequently referred to as "broadcast gypsum".

In recent years, much more sophisticated drip irrigation techniques have been used. Consequently, it is necessary to use a high quality calcium sulfate dihydrate. Thus, it is important to provide a quality solution grade calcium sulfate dihydrate which will improve sodium-calcium ion exchange in the soil. It is also important for that calcium sulfate dihydrate to remain in a solution and particularly in a suspension for a time sufficient to enable the material to be broadcast, that is to be distributed. Thus, it is necessary to have a vastly improved solubility characteristic for the calcium sulfate dihydrate.

It is known that reaction of a calcium source with an acid directly is not necessarily effective because the starting material actually becomes entrapped in the gypsum. The reaction actually takes place at the interface between the solids and this is essentially a heterogeneous reaction. Consequently, it is preferable to dissolve the calcium source in a solution and thereafter react the calcium with an appropriate acid, such as a sulfate containing acid and more particularly, sulfuric acid. It is also preferable to cause this reaction to take place in the presence of water, and even more so, in the presence of a lower molecular weight alcohol or ketone or aldehyde.

In accordance with the present invention, tests have shown that the calcium ion in accordance with the composition of this invention will go into solution much faster than other grades of calcium sulfate dihydrate. Moreover, in accordance with the present invention, production of a synthetic grade, water soluble, calcium sulfate dihydrate also enables processing of byproducts.

The present invention in a broad sense involves a method of improving ground soil irrigation by adding a soil additive, often referred to as a "soil amendment" to the soil to facilitate irrigation thereof. This soil additive comprises a synthetic solution grade calcium sulfate dihydrate which is made by the following process. A calcium compound having a calcium cation and an anion is contacted with a chemical agent enabling the calcium compound to yield calcium ions upon reaction thereof with the chemical agent and under conditions which enable the calcium cation to react with the anion of the chemical agent to form a second calcium compound.

The second calcium compound, which is produced as described above, is reacted in the presence of water with a sulfur containing acid capable of yielding sulfate containing moieties. This acid also causes a disassociation of the calcium cation and the anion. The reaction is allowed to proceed with the calcium cation and the sulfate containing moieties to form a dihydrated calcium sulfate.

In accordance with the present invention, the method allows the exchange of the calcium ion and the calcium sulfate dihydrate to replace the sodium ion in the ground soil. The calcium sulfate dihydrate which is produced for use as a soil additive in accordance with the present invention, is highly crystalline and will remain in suspension in water for a period of time greatly exceeding the length of time that a conventional solution grade calcium sulfate dihydrate will remain in suspension in water. Even more so, a much greater quantity of the calcium sulfate dihydrate of the present invention will remain in a given quantity of water in suspension when compared to a conventional solution grade calcium sulfate dihydrate.

It has also been found that the amount of the calcium sulfate dihydrate which can be produced and the amount which will remain in suspension can also be improved by adding a low molecular weight alcohol or ketone or aldehyde. Typically, at least fifty percent (50%) of this low molecular weight member, such as the alcohols, ketones and aldehydes, should not exceed about five carbon atoms in length. The amount of the alcohol, ketone, or aldehyde can be adjusted in the reaction medium in order to achieve the desired suspension. It has been found that both ethanol and acetone are highly effective members.

Also in accordance with the present invention, the sulfur containing acid is preferably a sulfate containing acid and even more preferably, a sulfuric acid. The step of recovering the hydrated calcium sulfate comprises filtering the calcium sulfate containing slurry and rinsing the same with a calcium sulfate solution. Further, the dihydrated calcium sulfate is also dried. As indicated above, it has been found that this synthetic solution grade hydrated calcium sulfate has a much higher disillusion rate than does a commercial grade or a reagent grade dihydrated calcium sulfate.

The present invention also provides a method of making a synthetic grade water soluble calcium sulfate dihydrate additive to improve ground soil irrigation. That method is based on those steps which were previously described. In a preferred embodiment, an acetic acid is contacted with a calcium compound in the presence of water to generate a calcium acetate therefrom. Otherwise, calcium fluoride could be used as a starting agent. The generated calcium acetate solution is contacted with a sulfur containing acid, such as sulfuric acid, in order to form the calcium sulfate dihydrate.

Various other calcium salts and calcium compounds, such as calcium hydroxide can be reacted with other acids, such as formic acid, propionic acid, butyric acid and acetic acid to form the calcium salt. Thus, if calcium hydroxide reacted with formic acid, a calcium formate will form. This calcium formate is then reacted with sulfuric acid to form the calcium sulfate dihydrate and also, again, regenerates the formic acid.

The present invention possesses many other advantages and has other purposes which will be made more clearly apparent from a consideration of the forms in which the invention may be embodied. These forms are described in more detail in the following detailed description of the invention. Further, they are exemplified by the drawings forming a part of this present specification. The various forms of producing the soil additive of the invention will now be described in detail for purposes of illustrating the general principles of the invention, but it is to be understood that the following detailed description, and for that matter, the accompanying drawings, are not to be taken in a limiting sense.

BRIEF DESCRIPTION OF THE DRAWINGS

Figure 1:
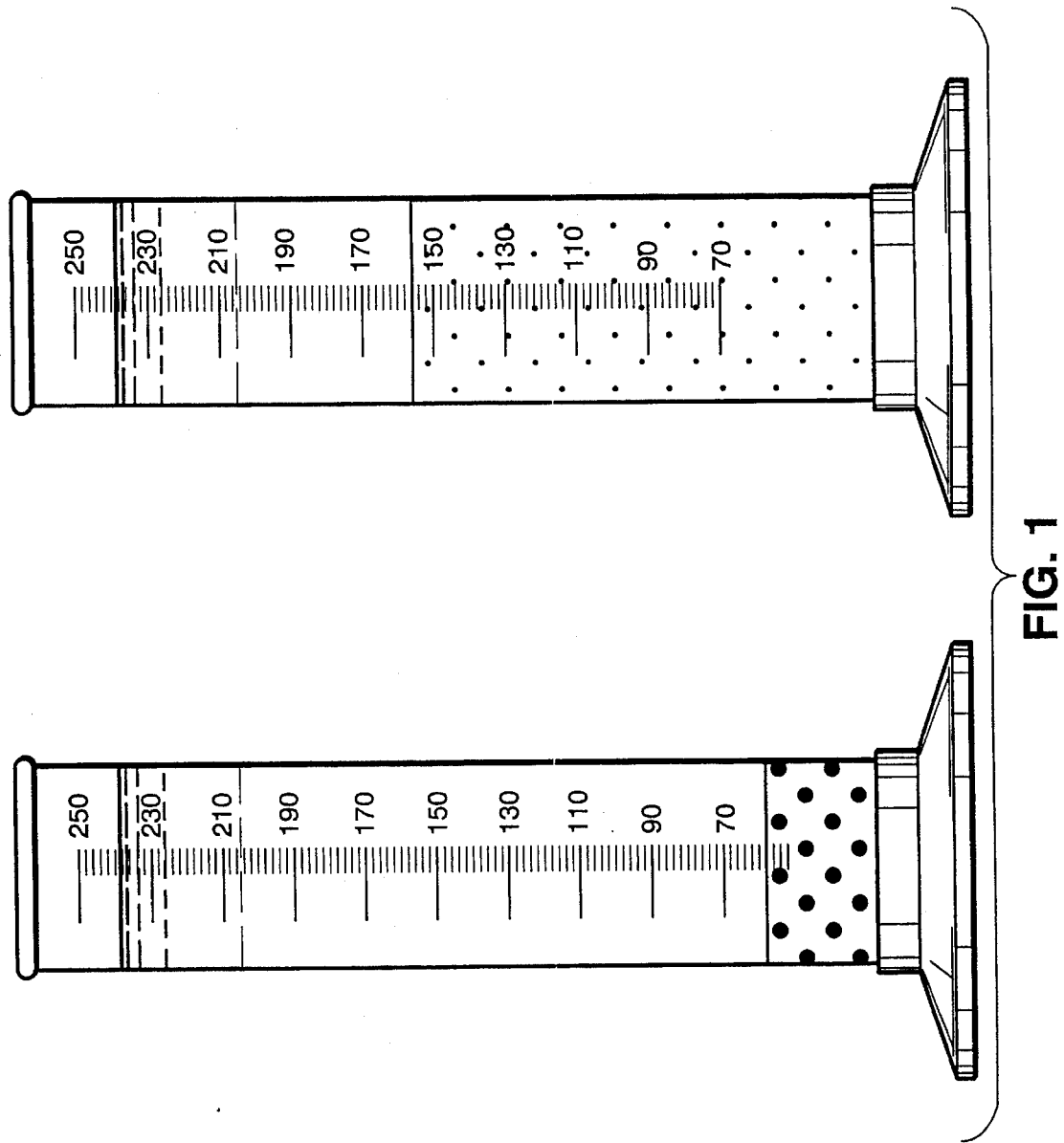
Figure 2:
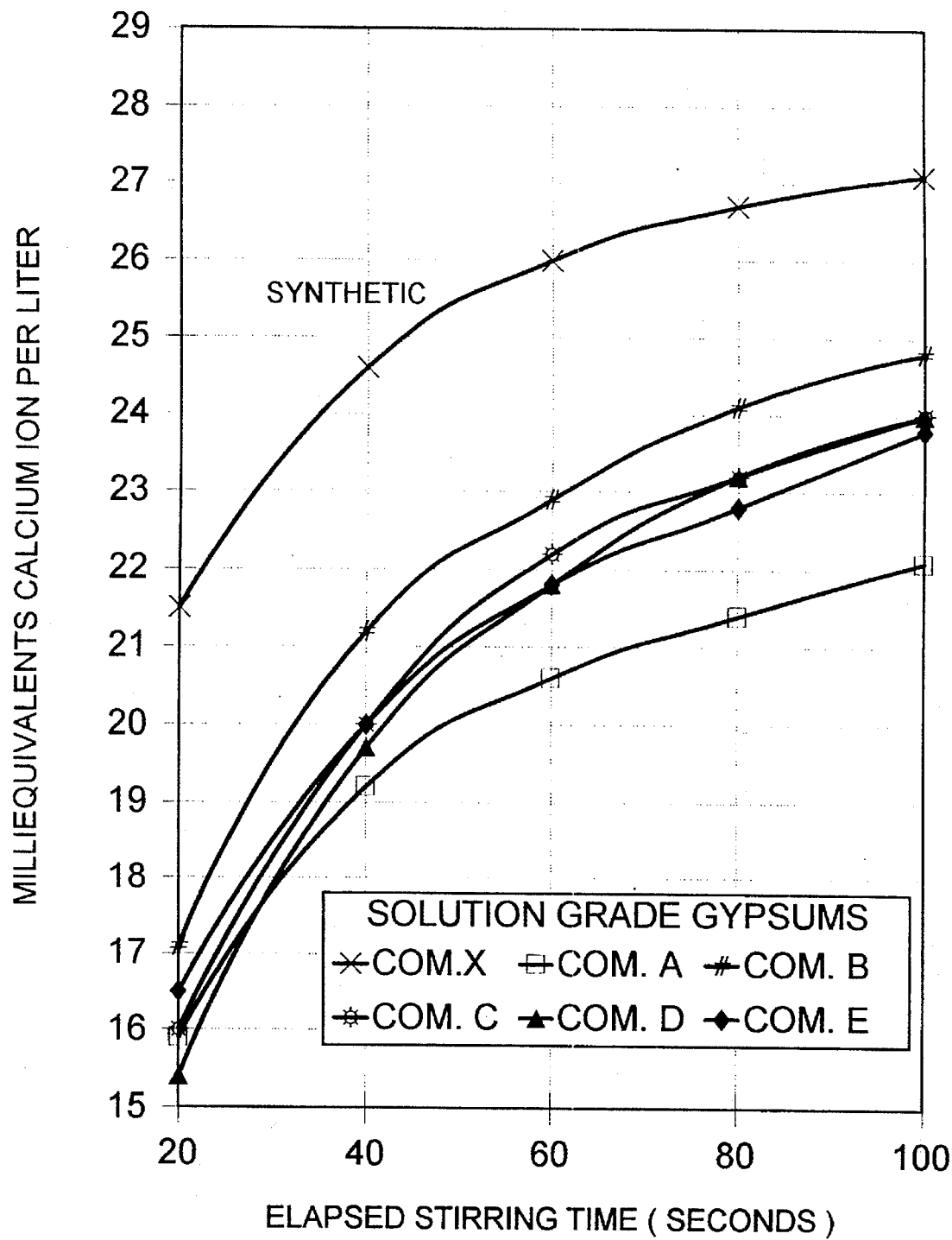
Figure 3:
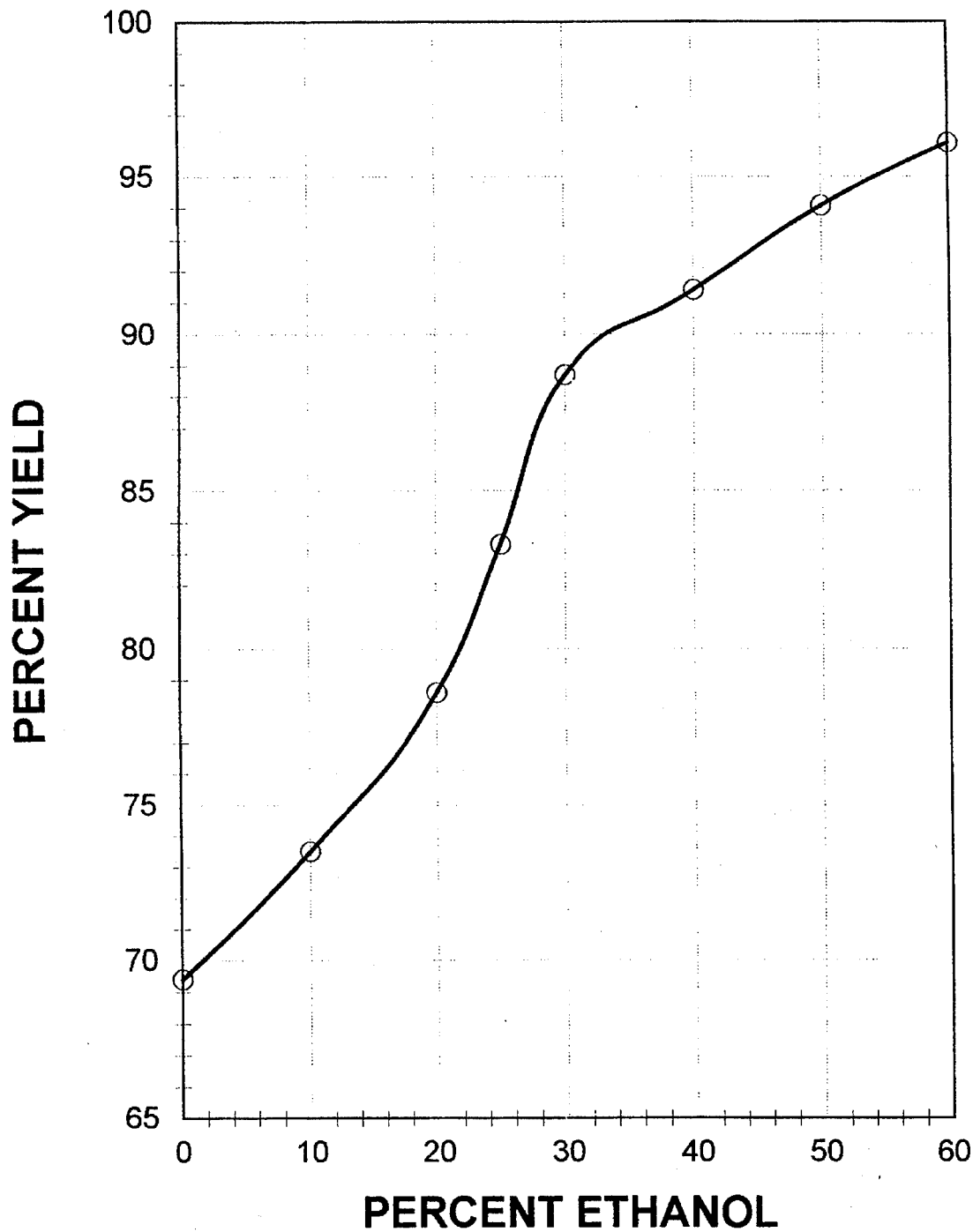

Having thus described the invention in general terms, reference will now be made to the accompanying drawings in which:

FIG. 1 is a schematic view showing actual levels of a suspension of a conventional commercial grade calcium sulfate dihydrate in water compared to the synthetic solution grade calcium sulfate dihydrate of the present invention in water;

FIG. 2 is a graphical illustration showing the elapsed stirring time as a function of the calcium ions in solution for the solution grade calcium sulfate dihydrate of the invention compared to other commercial grades thereof; and FIG. 3 is a graphical illustration showing a percentage of yield as a function of the addition of an alcohol, such as ethanol, to the reaction medium.

DETAILED DESCRIPTION OF A PREFERRED EMBODIMENT

Referring now in more detail to the method of improving ground soil irrigation by adding a soil additive to the soil to facilitate this irrigation, the present invention resides primarily in the method of preparing this synthetic solution grade calcium sulfate dihydrate. As indicated previously, it is known that the addition of calcium sulfate dihydrate (gypsum) will clearly improve soil conditions and facilitate irrigation. However, it is also known that the conventional solution grade calcium sulfate dihydrate remains in suspension for only a short period of time. The present invention enables preparation of the calcium sulfate dihydrate in such a manner that not only does the material remain in suspension for a much longer period of time, but a much greater quantity of the calcium sulfate dihydrate will remain permanently in suspension when compared to the commercial grades thereof.

In a broad sense, a calcium source (CaX) is caused to react with another chemical agent (A) to yield a soluble calcium species (CaA) as shown in the following unbalanced equation:

$$CaX + A \xrightarrow{solvent} CaA + X.$$

Generally, the reaction should take place in the presence of a solvent as shown.

A wide variety of calcium sources (CaX) and the chemical agents (A) would qualify as candidates for the use and the process of this invention and a limited number thereof are set forth below. Some of the calcium sources would be calcium oxide, calcium hydroxide, calcium carbonate and generally any calcium compound in which X is an anion. Some of the chemical agents which may be used include mineral acids and/or the salts of these mineral acids, carboxylic acids and their salts, various chemical chelating agents and acidic inorganic and organic materials.

As indicated previously, the reaction takes place in a solvent. That solvent is typically an aqueous solvent and may be water. However, solubility is decreased by the presence of a low molecular weight alcohol or glycol, a ketone, or aldehyde. The calcium sulfate dihydrate soil additive of the invention is typically added to irrigation waters which may have one or more of the following conditions: (1) a very low salinity, (2) a high concentration of bicarbonates or carbonates, (3) a moderate to high sodium concentration, (4) insufficient calcium ion concentration to effectively replace exchangeable sodium ions in the soil which is being irrigated.

The soluble calcium species may further be caused to react with a sulfur containing acid and particularly an acid which will yield a sulfate moiety to form the calcium sulfate dihydrate ($CaSO_4 \cdot 2H_2O$). Thus, in a preferred embodiment, the soluble calcium species may be further reacted with sulfuric acid to yield the calcium sulfate dihydrate along with regeneration of the original chemical agent (A) as indicated in the following unbalanced equation:

$$CaA + H_2SO_4 \xrightarrow{solvent} CaSO_4.2H_2O + A.$$

The calcium sulfate dihydrate thus formed is highly effective and has great agronomic value. As a result of the process by which it is formed, it has unique physical characteristics which impart to it superior aqueous dissolution rates. The bulk density of a mined commercial grade gypsum is about 2.3 grams per cubic centimeter. The bulk density of typical industrial gypsum is about 1.4 grams per cubic centimeter. The calcium sulfate dihydrate of the present invention has a bulk density of about 0.75 grams per cubic centimeter.

The synthetic solution grade calcium sulfate dihydrate produced in accordance with the invention, even when wetted is significantly more buoyant than other commercially available milled calcium sulfate dihydrates. This fact is actually shown in FIG. 1 which is a reproduced illustration of actual tests which have been conducted. The graduated cylinder on the right contains the synthetic calcium sulfate dihydrate in accordance with the present invention. A commercial grade calcium sulfate dihydrate is shown in the graduated cylinder on the left.

The materials in the graduated cylinders of FIG. 1 were obtained by using equal masses (60.00 grams) and equal volumes of water (220.0 ml) for each material in the respective cylinders. The two cylinders were inverted and shaken vigorously and allowed to stand undisturbed for 79 days. Readings were taken and recorded from time to time. However, on the 79th day, the height of the synthetic solution grade calcium sulfate dihydrate in accordance with the present invention was at the 156 millimeter graduation mark while that of the conventional calcium sulfate dihydrate was at a 56 millimeter graduation mark. The level of the water meniscus for both cylinders was approximately 240 mil.

Calculations for the slurry density for each cylinder of FIG. 1 further showed that the slurry density of the material in accordance with the present invention was 1.19 grams per milliliter and for the commercial grade was 1.54 grams per milliliter. The numerical slurry suspension ratio, being 2, 7 to 1, dramatically demonstrates the superior sustainable characteristics of the synthetic gypsum. This ratio can actually be used as an index to predict whether a given material requires agitation to prevent severe packing at the bottom of service and storage vessels. For most commercial grade materials, mechanical agitation is generally required.

The dry calcium sulfate dihydrate produced in accordance with the present invention may range from being highly crystalline to being somewhat amorphous. Thus, the more amorphous material has a lower bulk density and settles out at a slower rate. As indicated previously, the time in which the calcium sulfate dihydrate of the invention remains in suspension can be controlled by controlling the crystal size of the resultant material. This is a function of the aqueous system in which the reaction takes place. Further, it is a function of how fast the acid is added to the calcium compound. In addition, the presence of a solvent, such as a lower molecular weight, lower carbon content alcohol or ketone, or aldehyde will also decrease the solubility. However, decreasing the solubility by use of any of these solvents also makes crystal size smaller and hence this interferes with filtration of the solution. Consequently, some balance must be achieved when using a solvent.

As indicated previously, the lower molecular weight solvents, such as solvents having no more than five carbon atoms in a straight chain material are preferred. Thus, alcohols, such as ethanol, propanol and butanol can be used. It is also possible to use the low molecular weight ketones, such as acetone, methylethylketone, diethylketone, etc. The aldehydes which can be used include formaldehyde, acetaldehyde, propionaldehyde, butyraldehyde, etc. FIG. 3 shows a typical percentage yield as a function of the percentage of ethanol present in the reaction medium. It can be observed that when at least sixty percent (60%) of ethanol is employed in the reaction medium, the yield exceeds ninety five percent (95%). However, and as indicated previously, the particle size is adversely effected by the increase of the solvent.

FIG. 2 illustrates the stirring time as a function of the calcium ion obtained in a liter of solution. The designations Com.A, Com.B, Com.C, Com.D and Com.E represent various commercial solution grade calcium sulfate dihydrates. Com.X represents the calcium sulfate dihydrate produced in accordance with the present invention. It can be seen that there is a much greater calcium content per liter of aqueous solution than exists with any of the commercial grades.

It has been found that it is undesirable to react the calcium compound with an acid directly since the starting material becomes entrapped in the final gypsum, as aforesaid. The calcium can exist in essentially any form, such as almost any calcium salt. The calcium salt can be reacted, for example, with another acid, such as hydrochloric acid to form calcium chloride. The calcium chloride, or other calcium salt, is then reacted with the sulfuric acid to produce the calcium sulfate dihydrate. In one embodiment, calcium carbonate is reacted with hydrochloric acid to produce the calcium chloride and the calcium chloride is reacted with sulfuric acid to produce the gypsum. In each case, it can be observed that one of the starting materials is recovered and the recovering of this material enables the production of the materials used in this invention to be highly effective. Moreover, it has been found that by using at least fifty percent (50%) of the solvent, yields have increased to ninety percent (90%) and greater.

The final calcium sulfate dihydrate slurry which is produced in accordance with the process of the invention is typically then filtered in order to remove the solvent and other materials, and in order to obtain the final calcium sulfate dihydrate. Vacuum filtering is often employed. Further, the slurry may be rinsed several times with saturated calcium sulfate dihydrate solutions in order to minimize a loss of product. The filter cakes which result from the filter process are transferred to areas where they can be air dried or otherwise atmospherically dried.

EXAMPLES

The present invention is further illustrated by, but not limited to, the following examples:

Example 1

A synthetic grade calcium sulfate dihydrate was produced in accordance with the present invention as shown in the following equations:

$$Ca(OH)_2 + 2CH_3CO_2H \xrightarrow{H_2O} Ca(CH_3CO_2)_2 + 2H_2O \text{ and}$$

$$Ca(CH_3CO_2)_2 + H_2SO_4 \xrightarrow{H_2O} CaSO_4 \cdot 2H_2O + 2CH_3CO_2H$$

A 600 milliliter beaker was charged with distilled water in an amount of approximately 300 milliliters and about 60 milliliters of glacial acetic acid. A magnetic stirring bar was included in the solution. The solution was then stirred at a rate of about 450 rpm while 37 grams of calcium hydroxide was slowing added. The initial and final pH's of the solution were 2.02 and 5.34, respectively.

The final solution was somewhat cloudy and was vacuum filtered through a bed of diatomaceous earth to yield a sparkling, water clear solution. The resulting solution was then transferred to a one liter beaker and again stirred at about 450 rpm. Further pH measurements revealed that the pH was 5.65 at 30.8 degrees C.

A sulfuric acid solution (27 mil, 98% $H_2SO_4$+75 ml of distilled water) was then added slowly to the stirred solution. The initial pH was 5.55 and the final pH was 1.43.

As the sulfuric acid was added, the solution became slightly cloudy and then proportionately more cloudy with each addition of the acid solution. The slurry was then vacuum filtered and rinsed several times with saturated calcium sulfate dihydrate solutions in order to minimize loss of product. The filter cake then resulting from the filter operation was transferred to aluminum pans and dried at 114 degrees F overnight.

The dried material was then broken up into small pieces and gently ground with a mortar and pestle to break up small chunks. The material was then further dried to yield 82.10 grams of synthetic solution grade calcium sulfate dihydrate with a theoretical yield of 85.97 grams.

The overall yield was actually found to be 95.5% and subsequent chemical analysis placed the purity of the calcium sulfate dihydrate at 97.34%.

Dissolution experiments were also carried out comparing this material with two commercially available solution grade gypsum materials and a reagent grade gypsum powder. The attached graph of FIG. 2 demonstrates superior results achieved by the synthetic solution grade calcium sulfate dihydrate produced in accordance with the present invention.

Example 2

A one liter beaker was charged with precipitated calcium carbonate in an amount of 29.07 grams. A two inch magnetic stirring bar was also introduced into the beaker. Distilled water in an amount of 350 milliliters and ethanol in an amount also of 350 milliliters were added to the beaker.

The beaker was then placed on a magnetic stirrer and the contents stirred initially at about 500 rpm. Hydrochloric acid (52 ml, 20° Be') was added portionwise over a period of several minutes.

A sulfuric acid solution was prepared by the addition of sulfuric acid (17 ml, 66° Be') to ice cold distilled water (33 ml). The acid solution was then transferred to a 50 milliliter buret mounted over the stirred calcium chloride solution. The buret stopcock was opened and adjusted to deliver the sulfuric acid solution dropwise. Upon contact of the sulfuric acid with the stirred calcium chloride solution, a white nucleus was formed. Eventually, it was necessary to increase the stirring rate in order to maintain a vigorous mixing. Near the endpoint of the acid addition, an additional volume (100 ml each) of water and ethanol was added in an effort to maintain a vortex in the stirred solution. Despite the effort to maintain this vortex, and even with a stirring rate of 900 rpm, the slurry became too thick.

After complete acid solution addition, the slurry was allowed to stir for an additional 10 minutes. The stirrer was then deactivated and the beaker contents were stirred manually for an additional period of time to insure complete mixing.

The slurry was then poured into a Büchner funnel mounted on the top of a sidearm vacuum flask that was, in turn, connected to an activated water aspirator. The filter cake which was produced was then rinsed with ethanol (4×50 ml) and acetone (2×50 ml). The filter cake was then transferred to a 600 milliliter beaker followed by the addition of 300 milliliters of acetone. The mixture was manually stirred until a freely flowing slurry was obtained.

The slurry was then vacuum filtered and dried at 114<F to obtain 47.04 grams of synthetic gypsum with an analyzed purity of 99.85%. A calculated yield was 94.08%. The chemical reactions involved in this example are those set forth below.

$$CaCO_3 + 2HCl \xrightarrow[EtOH]{H_2O} CaCl_2 + H_2CO_3$$

$$H_2CO_3 \rightleftarrows H_2O + CO_2\uparrow$$

$$CaCl_2 + H_2SO_4 \xrightarrow[EtOH]{H_2O} CaSO_4 \cdot 2H_2O\downarrow + 2HCl \qquad 5$$

Thus, there has been illustrated and described a unique and novel method of improving ground soil irrigation by adding a soil additive to the soil to facilitate irrigation thereof and which is made by a special process as described and claimed herein but which improves solubility and crystalinity. The present invention thereby fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Example 3

A 400 milliliter beaker had a magnetic stirring bar two inches in length introduced therein and was charged with 14.54 grams of calcium carbonate and 100 milliliters of distilled water. The contents were stirred at 450 rpm while HCl 20° Be', 33 ml was added portionwise over a period of five minutes. Upon complete dissolution of the calcium carbonate, a 100 millimeter buret was charged with sulfuric acid 66° Be' in an amount of 8.5 milliliters and 16.5 milliliters of distilled water. The buret was mounted over the stirred calcium chloride solution and a stopcock opened and adjusted to deliver the acid mixture dropwise over a period of twenty minutes.

Upon the addition of a few millimeters of the acid/water mixture, the stirred solution became cloudy and eventually had adopted the consistency of a slurry. The buret was then charged with 100 milliliters of acetone and this acetone was then delivered to the slurry over the next twenty five minutes thereby salting-out the dissolved calcium sulfate dihydrate composition.

The slurry was next transferred to a Büchner funnel mounted on a side arm filter flask and under reduced pressure. The filter cake was then rinsed with acetone and dried at 45° C. The yield was 24 grams of synthetic solution grade calcium sulfate dihydrate having a ninety six percent (96%) yield and an analyzed purity of one hundred point four percent (100.4%). The chemical reactions which were involved are:

Limestone dissolution, $CaCO_3 + 2HCl \rightarrow CaCl_2 + H_2O + CO_2$

Gypsum formation, $CaCl_2 + H_2SO_4 + 2H_2O \rightarrow CaSO_4 \cdot 2H_2O + 2HCl$ Net reaction, $CaCO_3 + H_2SO_4 + H_2O \rightarrow CaSO_4 \cdot 2H_2O + CO_2$.

Having thus described the invention, what I desire to claim and secure by letters patent is:

1. A method of improving ground soil irrigation by adding a soil additive to the soil to facilitate irrigation thereof and which soil additive comprises synthetic solution grade calcium sulfate dihydrate made by the process comprised of:
   a) contacting a calcium compound having a calcium cation and an anion with a chemical agent enabling the calcium compound to yield calcium ions upon reaction thereof with the chemical agent and under conditions which enable the calcium cation to react with the anion of the chemical agent to form a second calcium compound;
   b) reacting in the presence of water the second calcium compound with a sulfur containing acid capable of yielding sulfate containing moieties and which also causes a disassociation of the calcium cation and said anion;
   c) allowing the reaction of the calcium cations and the sulfate containing moieties to form a hydrated calcium sulfate dihydrate.

2. The method of improving ground soil irrigation of claim 1 further characterized in that the method allows the exchange of the calcium ion in the calcium sulfate dihydrate to replace sodium in the ground soil.

3. The method of improving ground soil irrigation of claim 1 further characterized in that the calcium sulfate dihydrate is highly crystalline and will remain in suspension in water for a period of time exceeding three times the length of time that a conventional solution grade calcium sulfate dihydrate will remain in suspension in water.

4. The method of improving ground soil irrigation of claim 1 further characterized in that at least 50% of a low molecular weight member selected from the class consisting of alcohols, ketones and aldehydes not exceeding 5 carbon atoms in length is added to the reaction medium.

5. The method of improving ground soil irrigation of claim 4 further characterized in that the member is an alcohol.

6. The method of improving ground soil irrigation of claim 4 further characterized in that the member is ethanol.

7. The method of improving ground soil irrigation of claim 4 further characterized in that the sulfur containing acid is sulfuric acid.

8. The method of improving ground soil irrigation of claim 4 further characterized in that the step of recovering the hydrated calcium sulfate comprises filtering the calcium sulfate containing slurry and rinsing the same with a calcium sulfate solution.

9. The method of improving ground soil irrigation of claim 8 further characterized in that the step of recovering the hydrated calcium sulfate also comprises drying the recovered calcium sulfate.

10. The method of improving ground soil irrigation of claim 1 further characterized in that the synthetic grade hydrated calcium sulfate of claim 1 has a higher dissolution rate than does commercial grade and reagent grade hydrated calcium sulfate.

11. A method of making a synthetic grade water soluble calcium sulfate dihydrate soil additive to improve ground soil irrigation:
   a) contacting acetic acid with a calcium cation to generate a calcium acetate therefrom;
   b) contacting the generated calcium acetate solution with a sulfur containing acid which will readily yield the sulfur moiety upon reaction thereof to generate a hydrated calcium sulfate containing slurry; and
   c) recovering the hydrated calcium sulfate from the calcium sulfate containing slurry.

12. The method of improving ground soil irrigation of claim 11 further characterized in that said method comprises contacting a solution of the acetic acid with the calcium acetate during agitation thereof.

13. The method of improving ground soil irrigation of claim 11 further the step of recovering the hydrated calcium sulfate comprises filtering the calcium sulfate containing slurry and rinsing the same with a calcium sulfate solution.

14. The method of improving ground soil irrigation of claim 13 further characterized in that the step of recovering the hydrated calcium sulfate also comprises drying the recovered calcium sulfate.

15. The method of improving ground soil irrigation of claim 11 further characterized in that the synthetic grade hydrated calcium sulfate of claim 11 has a higher dissolution rate than does commercial grade and reagent grade hydrated calcium sulfate.

16. A method of making a synthetic grade water soluble calcium sulfate dihydrate soil additive to improve ground soil irrigation, said method comprising:

a) contacting acetic acid with a calcium compound in the presence of water to generate a calcium acetate solution therefrom;

b) contacting the generated calcium acetate solution with a sulfur containing acid which will readily yield a sulfur moiety upon reaction thereof to generate a hydrated calcium sulfate containing slurry; and c) recovering the hydrated calcium sulfate from the calcium sulfate containing slurry.

17. The method of improving ground soil irrigation of claim 16 further characterized in that said method comprises contacting a solution of the acetic acid with the calcium acetate during agitation thereof.

18. The method of improving ground soil irrigation of claim 16 further characterized in that the calcium cation is derived from calcium hydroxide.

19. The method of improving ground soil irrigation of claim 18 further characterized in that the calcium hydroxide is contacted with the acetic acid in the presence of water.

* * * * *